(12) United States Patent
Sun et al.

(10) Patent No.: US 12,265,924 B1
(45) Date of Patent: Apr. 1, 2025

(54) ROBUST MULTI-AGENT REINFORCEMENT LEARNING

(71) Applicant: Amazon Technologies, Inc., Seattle, WA (US)

(72) Inventors: Tao Sun, Bellevue, WA (US); Yunzhe Tao, Bothell, WA (US); Sahika Genc, Fall City, WA (US); Sunil Mallya Kasaragod, San Francisco, CA (US); Kaiqing Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 923 days.

(21) Appl. No.: 16/908,486

(22) Filed: Jun. 22, 2020

(51) Int. Cl.
  *G06N 5/04* (2023.01)
  *G06N 5/043* (2023.01)
  *G06N 20/00* (2019.01)

(52) U.S. Cl.
  CPC ............ *G06N 5/043* (2013.01); *G06N 20/00* (2019.01)

(58) Field of Classification Search
  CPC ...... G06Q 40/00; G06F 16/951; G08G 1/081; B25J 9/1697; G06N 3/044
  See application file for complete search history.

(56) References Cited

U.S. PATENT DOCUMENTS

| | | | | |
|---|---|---|---|---|
| 2005/0245303 | A1* | 11/2005 | Graepel | G06N 3/006 463/1 |
| 2013/0297477 | A1* | 11/2013 | Overman | G06Q 40/00 705/37 |
| 2014/0279737 | A1* | 9/2014 | Horvitz | G06N 20/00 706/12 |
| 2015/0102945 | A1* | 4/2015 | El-Tantawy | G08G 1/081 340/909 |
| 2016/0350660 | A1* | 12/2016 | Horvitz | G06N 20/00 |
| 2019/0279096 | A1* | 9/2019 | de Nijs | G06F 16/951 |
| 2021/0089966 | A1* | 3/2021 | Schmidhuber | G06N 3/044 |
| 2021/0178600 | A1* | 6/2021 | Jha | B25J 9/1697 |

OTHER PUBLICATIONS

A Reward optimization Method Based on Action Sub-reward Hierarchical Reinforcement Learning (Year: 2014).*
Doshi et al W14-The 8th Workshop Multiagent Sequential Decision Making Under Uncertainty (MSDM 2013), Saint Paul Minnesota USA pp. 1-18 (Year: 2013).*
Zou et al Continuous Reinforcement Learning From Human Demonstrations With Intergard Experience Replay for Autonomous Driving (Dec. 5-8, 2017) IEEE pp. 2452-2455 (Year: 2017).*

(Continued)

*Primary Examiner* — Saba Dagnew
(74) *Attorney, Agent, or Firm* — Nicholson De Vos Webster & Elliott LLP

(57) ABSTRACT

Techniques for robust multi-agent reinforcement learning (MARL) are described. An exemplary method includes initializing a plurality of parameters for a plurality of agents including at least policy parameters and action-value (Q) parameters; performing robust multi-agent reinforcement learning to learn polices for the agents, wherein in the learned polices no agent has an incentive to deviate, the agents include an implicit agent that is to select a worst-case at any given time during the learning process; and at least one agent utilizing its learned policy.

20 Claims, 10 Drawing Sheets

(56) References Cited

OTHER PUBLICATIONS

Abdullah et al., "Wasserstein Robust Reinforcement Learning", arXiv:1907.13196v4 [cs.LG], Sep. 16, 2019, 22 pages.
Aghassi et al., "Robust game theory", Math. Program., Ser. B 107, 231-273 (2006).
Amiri et al., "A Machine Learning Approach for Power Allocation in HetNets Considering QoS", arXiv:1803.06760v1 [cs.IT], Mar. 18, 2018, 7 pages.
Andrychowicz et al., "Learning dexterous in-hand manipulation", The International Journal of Robotics Research 2020, vol. 39(1), 2018, pp. 3-20.
Arslan et al., "Decentralized Q-Learning for Stochastic Teams and Games", arXiv:1506.07924v2 [math. OC], May 2, 2016, 13 pages.
Barton et al., "Measuring collaborative emergent behavior in multiagent reinforcement learning", Human Systems Engineering and Design, Oct. 2018, pp. 422-427.
Berner et al., "Dota 2 with Large Scale Deep Reinforcement Learning", arXiv: 1912.06680v1 [cs.LG], Dec. 13, 2019, 66 pages.
Boutilier, C., "Planning, Learning and Coordination in Multiagent Decision Processes", Proceedings of the 6th Conference on Theoretical Aspects of Rationality and Knowledge, 1996, pp. 195-210.
Derman et al., "Soft-Robust Actor-Critic Policy-Gradient", arXiv: 1803.04848v2 [cs.LG], Oct. 24, 2018, 17 pages.
Foerster et al., "Counterfactual Multi-Agent Policy Gradients", The Thirty-Second AAAI Conference on Artificial Intelligence (AAAI-18), 2018, pp. 2974-2982.
Foerster et al., "Learning to Communicate with Deep Multi-Agent Reinforcement Learning", 30th Conference on Neural Information Processing Systems, 2016, 9 pages.
Foerster et al., "Stabilising Experience Replay for Deep Multi-Agent Reinforcement Learning", Proceedings of the 34th International Conference on Machine Learning, 2017, 10 pages.
García et al., "A Comprehensive Survey on Safe Reinforcement Learning", Journal of Machine Learning Research 16, 2015, pp. 1437-1480.
Gupta et al., "Cooperative Multi-Agent Control Using Deep Reinforcement Learning", International Conference on Autonomous Agents and Multi-Agent Systems, 2017, pp. 66-83.
Hu et al., "Nash Q-Learning for General-Sum Stochastic Games", Journal of Machine Learning Research 4, 2003, pp. 1039-1069.
Iqbal et al., "Actor-Attention-Critic for Multi-Agent Reinforcement Learning", Proceedings of the 36th International Conference on Machine Learning, 2019, 10 pages.
Iyengar, G. "Robust dynamic programming", Mathematics of Operations Research, CORC Tech Report TR-2002-07, May 2005, 30 pages.
Kar et al., "QD-Learning: A Collaborative Distributed Strategy for Multi-Agent Reinforcement Learning Through Consensus + Innovations", arXiv:1205.0047v2 [stat. ML], Oct. 25, 2012, 33 pages.
Kardes et al., "Discounted Robust Stochastic Games and an Application to Queueing Control", Operations Research, vol. 59, No. 2, Mar.-Apr. 2011, pp. 365-382.
Kober et al., "Reinforcement Learning in Robotics: A Survey", The International Journal of Robotics Research, 32(11), 2013, 73 pages.
Lee et al., "Optimization for Reinforcement Learning: From Single Agent to Cooperative Agents", arXiv:1912.00498v1 [cs.LG], Dec. 1, 2019, 23 pages.
Li et al., "Robust Multi-Agent Reinforcement Learning via Minimax Deep Deterministic Policy Gradient", The Thirty-Third AAAI Conference on Artificial Intelligence (AAAI-19), vol. 33, No. 1, Jul. 2019, pp. 4213-4220.
Lil'Log, "Policy Gradient Algorithms", available online at <https://lilianweng.github.io/posts/2018-04-08-policy-gradient/>, Apr. 8, 2018, 32 pages.
Lim et al., "Reinforcement Learning in Robust Markov Decision Processes," Advances in Neural Information Processing Systems, 2013, pp. 701-709.

Littman, M.L., "Markov games as a framework for multi-agent reinforcement learning", International Conference on Machine Learning, 1994, pp. 157-163.
Lowe et al., "Multi-Agent Actor-Critic for Mixed Cooperative-Competitive Environments", 31st Conference on Neural Information Processing Systems (NIPS 2017), Dec. 2017, 12 pages.
Morimoto et al., "Robust Reinforcement Learning", Neural Computation, vol. 17, 2005, pp. 335-359.
Nilim et al., "Robust Control of Markov Decision Processes with Uncertain Transition Matrices", Operations Research, vol. 53, No. 5, Sep.-Oct. 2005, pp. 780-798.
O'Donoghue et al., "Combining Policy Gradient and Q-Learning", ICLR 2017, 15 pages.
Pinto et al., "Robust Adversarial Reinforcement Learning", Proceedings of the 34th International Conference on Machine Learning, vol. 70, 2017, pp. 2817-2826.
Rodriguez, J., "Modern Game Theory and Multi-Agent Reinforcement Learning Systems", available online at <https://www.linkedin.com/pulse/modern-game-theory-multi-agent-reinforcement-learning-jesus-rodriguez/>, Jul. 18, 2018, 3 pages.
Sallab et al., "Deep Reinforcement Learning framework for Autonomous Driving", arXiv:1704.02532v1 [stat.ML], Apr. 8, 2017, 7 pages.
Shalev-Shwartz et al., "Safe, Multi-Agent, Reinforcement Learning for Autonomous Driving", arXiv:1610.03295v1 [cs. AI], Oct. 11, 2016, 13 pages.
Silver et al., "Mastering the game of Go with deep neural networks and tree search", Nature, vol. 529, Jan. 2016, 20 pages.
Silver et al., "Mastering the Game of Go without Human Knowledge", Nature, vol. 550, 2017, 42 pages.
Sutton et al., Reinforcement Learning: An Introduction, Second edition, 2020, 548 pages.
Szepesvari et al., "A Unified Analysis of Value-Function-Based Reinforcement-Learning Algorithms", Neural Comput. 11(8), Nov. 1999, pp. 2017-2059.
Tan, M., "Multi-Agent Reinforcement Learning Independent vs Cooperative Agents", International Conference on Machine Learning, 1997, 8 pages.
Vereshchaka, A., "Multi-agent Reinforcement Learning (Marl)", CSE4/510 Reinforcement Learning Fall 2019, Nov. 14, 2019, 78 pages.
Vinyals et al., "Grandmaster level in StarCraft II using multi-agent reinforcement learning", Nature, vol. 575, Nov. 2019, 22 pages.
Wang et al., "Reinforcement Learning to Play an Optimal Nash Equilibrium in Team Markov Games", Advances in Neural Information Processing Systems, 2003, pp. 1603-1610.
Wiesemann et al., "Robust Markov Decision Processes", Mathematics of Operations Research, 38(1), Feb. 9, 2012, 52 pages.
Wikipedia, "Q-learning", available online at <https://en.wikipedia.org/w/index.php?title=Q-learning&oldid=1187753394>, Dec. 1, 2023, 8 pages.
Yan et al., "A Survey and Analysis of Multi-Robot Coordination", International Journal of Advanced Robotic Systems, vol. 10, 2013, 18 pages.
Zhang et al., "Finite-Sample Analysis For Decentralized Batch Multi-Agent Reinforcement Learning With Networked Agents", arXiv:1812.02783v8 [cs.LG], Dec. 14, 2020, 48 pages.
Zhang et al., "Fully Decentralized Multi-Agent Reinforcement Learning with Networked Agents", Proceedings of the 35th International Conference on Machine Learning, 2018, 10 pages.
Zhang et al., "Multi-Agent Reinforcement Learning: A Selective Overview of Theories and Algorithms", arXiv:1911.10635v2 [cs. LG], Apr. 2021, 73 pages.
Zychlinski, S., "The Complete Reinforcement Learning Dictionary", available online at <https://towardsdatascience.com/the-complete-reinforcement-learning-dictionary-e16230b7d24e#c274>, Feb. 24, 2019, 17 pages.

* cited by examiner

ROBUST MULTI-AGENT REINFORCEMENT LEARNING

BACKGROUND

Deep reinforcement learning (RL) has been extensively used in solving challenging problems, varying from robotics and autonomous driving to game playing. The systems that contain multiple agents are typically modeled by multi-agent reinforcement learning (MARL) problems, where the agents usually interact in one of the three ways: 1) fully cooperative, 2) fully competitive, or 3) mixed of the two. MARL addresses the sequential decision-making problem of multiple agents in a common environment, where the goal of each agent is to optimize its long-term return by interacting with the environment and other agents.

BRIEF DESCRIPTION OF DRAWINGS

Various embodiments in accordance with the present disclosure will be described with reference to the drawings, in which:

FIG. 7 illustrates an example of physical environment for a plurality of agents to interact with.

DETAILED DESCRIPTION

Figure 1:
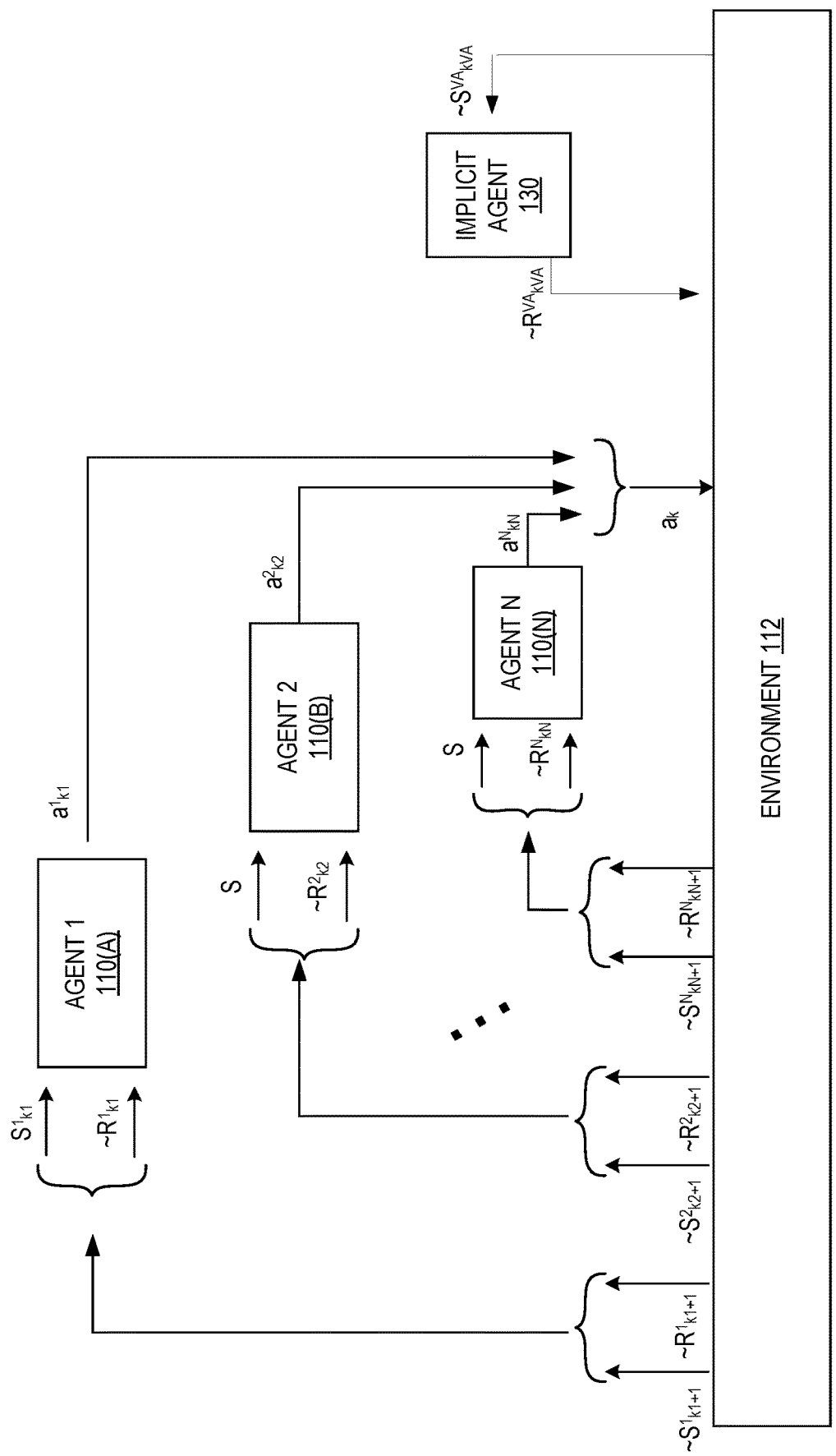
FIG. 1 illustrates embodiments of a framework that utilizes robust MARL techniques to learn policies.

The present disclosure relates to methods, apparatus, systems, and non-transitory computer-readable storage media for robust multi-agent reinforcement learning. According to some embodiments, a virtual (or implicit) agent helps to introduce uncertainty in both reward function and/or transitions (next state)

None of the aforementioned techniques of the background have explicitly considered the uncertainty of reward functions or transition dynamics in a MARL problem In embodiments detailed herein, multi-agent reinforcement learning (MARL) is made more robust by using uncertainty in one or more of reward functions and/or transition dynamics and may be referred to as robust MARL. An exemplary use case is in a multi-car racing setting, where each agent (car) has its own reward function and has incomplete information of other agents' rewards and transition dynamics. Prior work on MARL accounts for no uncertainty in the reward or model which is usually not the case in real-world applications.

In embodiments detailed here, the MARL problem is modeled as a robust Markov game where the goal of all agents is to find a policy such that no agent has the incentive to deviate. This may be considered to be Nash equilibrium (NE) policies, which are also robust to the possible uncertainty of the MARL model. To find such robust NE policies, in some embodiments a Q-learning algorithm is defined. To handle possibly enormous state-action spaces in practice, a policy gradient theorem for robust MARL and an actor-critic approach in a centralized-training-decentralized-execution paradigm are described.

As noted, the interaction among agents is modeled in a general framework, i.e., as a Markov game. Generally speaking, a Markov game G is a tuple $G:=(N,S,\{A^i\}_{i\in N}, \{R^i\}_{i\in N}, P, \gamma)$, where $N=[N]$ denotes the set of N agents, S is the state space that is shared over all agents, and $A^i$ denotes the action space of agent $i \in N$. $R_i^{z,S} \times A^1 \times \ldots \times A^N \to \mathbb{R}$ represents the reward function of agent i, which is dependent on the state and the joint action of all agents. $P: S \times A^1 \times \ldots \times A^N \to \Delta(S)$ represents the state transition probability that is a mapping from the current state and the joint action to the probability distribution over the state space. Lastly, $\gamma \in [0,1]$ is the discounting factor.

At time t, each agent selects its own action $a_t^i \in A^i$ given the system state $s_t$, according to its own policy $\pi^i: S \to \Delta(A^i)$, which is a mapping from the state space to the probability distribution over action space $A^i$. Note that here we only consider the Markov policies that depend on the current state $s_t$ at time t. Then, the system transits to the next state $s_{t+1}$ and each agent i receives an instantaneous reward $r_t^i = R^i(s_t, a_t^1, \ldots, a_t^N)$. The goal of each agent i is to maximize the long-term return $J^i$ calculated by:

$$\max_{\pi^i} J^i(\pi^i, \pi^{-i}) := \mathbb{E}\left[\sum_{t=0}^{\infty} \gamma^t r_t^i \middle| s_0, a_t^i \sim \pi^i(\cdot|s_t)\right],$$

where $-i$ represents the indices of all agents except agent i, and $\pi^{-i} := \Pi_{j \neq i} \pi^j$ refers to the joint policy of all agents except agent i. In the same vein, one can define the value and action-value (Q)-function for each agent i as follows:

$$V^i(s) := \mathbb{E}\left[\sum_{t=0}^{\infty} \gamma^t r_t^i \middle| s_0 = s, a_t^i \sim \pi^i(\cdot|s_t)\right],$$

$$Q^i(s, a^1, \ldots, a^N) := \mathbb{E}\left[\sum_{t=0}^{\infty} \gamma^t r_t^i \middle| s_0 = s, a_0^i = a^i, a_t^i \sim \pi^i(\cdot|s_t)\right].$$

Since agents' policies are coupled in $J^i$, maximizing the return of a single agent is unattainable. Instead, one commonly used solution concept is the (Markov perfect) Nash equilibrium (NE) of the game. The NE is defined as the point of a joint policy $\pi_* := (\pi_*^1, \ldots, \pi_*^N)$ at which $J^i(\pi_*^i, \pi_*^{-i}) \geq J^i(\pi^i, \pi_*^{-i}), \forall i \in N$, namely, given all other agents' equilibrium policies $\pi_*^{-i}$, there is no motivation for agent i to deviate from $\pi_*^i$. Hence, the goal of a traditional MARL is to solve for the NE of Markov games G without the knowledge of the model.

However, in many practical applications, the agents may not have perfect information of the model, i.e., the reward function and/or the transition probability model.

Thus, the desired policy should not only be robust to other agents' policies, but also robust to the possible uncertainty of the MARL model. As such, this problem can be modeled as a robust Markov game for which there is uncertainty in transition probabilities between states and reward functions. Note that reward functions may be different per agent.

FIG. 1 illustrates embodiments of a framework that utilizes robust MARL techniques to learn policies. In particular, embodiments detailed herein utilize uncertainty in learning policies of at least agents that are not implicit. As shown, a plurality of agents (e.g., agent 1 110(A), agent 2 110(B), agent N 110(N), etc. interact with an environment 112 (either physical or virtual) according to their individual policies for a given state (S) that is common to all agents. The uncertain reward (R) may be used during training. The resultant action (a) is therefore also uncertain. An implicit agent 130 also interacts with the environment, but has policies that correspond to each of the other agents 110(A)-(N). Note that states returned from the environment 112 are uncertain.

In particular, each agent 110(A)-(N) and 130 considers a distribution-free Markov game to be played using robust optimization. This allows the use of simple uncertainty sets of the model, and requires no a prior probabilistic information about the uncertainty, e.g., distribution of the class of models. Note that if an agent knows how to play in the robust Markov game optimally starting from the next stage on, then that agent would play to maximize not only the worst-case (minimal) expected immediate reward due to the model uncertainty set at the current stage, but also the worst-case expected reward incurred in the future stages. Formally, such a recursion property leads to the following Bellman-type equation:

$$\overline{V}_*^i(s) = \max_{\pi^i(*|s)} \min_{\substack{\overline{R}_s^i \in R_s^i \\ P(*|s_t^*) \in P_s}} \sum_{a \in A} \prod_{j=1}^N \pi^j(a^j|s) \left( \overline{R}^i(s, a) + \gamma \sum_{s' \in S} \overline{P}(s'|s, a) \overline{V}_*^i(s') \right),$$

where $\overline{V}_*^t: S \to \mathbb{R}$ denotes the optimal robust value, and $\overline{R}_s^t + [\overline{R}^t(s, \alpha)]_{\alpha \in A}^1 \in \overline{R}_s^t \subseteq \mathbb{R}^{|A|}$ with $\alpha = (\alpha^1, \ldots, \alpha^N)$, is the vector of possible reward values of agent i that lies in the uncertain set of vectors $\overline{R}_s^t$ at state s. $\overline{P}(*|s_t^*)A \to \Delta(S)$ denotes the possible transition probability lying in the uncertain set $\overline{P}_s$.

The uncertainty here (note that a bar above a letter or tilde in the figure indicates uncertainty) can be viewed as the decision made by the implicit agent 130 (also called the nature agent), who always plays against the others agents 110(A)-(N) by selecting the worst-case data at every state. If such an optimal robust value exists, then it leads to a definition of robust Markov perfect Nash equilibrium (RM-PNE), the solution concept for robust Markov games. As such, the implicit agent 130 takes in an uncertain state and uncertain rewards and returns an uncertain reward.

A joint policy $\pi_*:=(\pi_*^1, \pi_*^2, \ldots, \pi_*^N)$ is the robust Markov perfect Nash equilibrium, if for any $s \in S$ and all $i \in N$, there exists a vector of value functions $V_*=(V_*^1, \ldots, V_*^N)$ with each $$\overline{V}_*^i : S \to \mathbb{R}, \text{ such that}$$

$$\pi_*^i(*|s) \in = \operatorname*{argmax}_{\pi^i(*|s)} \min_{\substack{\overline{R}_s^i \in R_s^i \\ P(*|s_t^*) \in P_s}} \sum_{a \in A} \pi^i(a^i|s) \prod_{j \neq i} \pi_*^j(a^j|s).$$

-continued $$\left( \overline{R}^i(s, a) + \gamma \sum_{s' \in S} \overline{P}(s'|s, a) \overline{V}_*^i(s') \right).$$

There are several ways to find the RMPNE. To find the Markov perfect NE defined above, the Bellman-type equation for the robust Markov game is solved.

In some embodiments, when the model is known to the agents, a value iteration approach is applied by the agents. In particular, the agents learn a value function $\overline{V}$ by updating the Bellman equation:

$$\overline{V}_{t+1}^i(s) = \max_{\pi^i(*|s)} \min_{\overline{R}_s^i \in R_s^i} \sum_{a \in A} \prod_{j=1}^N \pi^j(a^j|s) T^i(s, a)$$

$$=: T_v^i(\overline{V}_t^i)$$

As a result, the desired value function $\overline{V}^t$ is a fixed-point of the operator $T_v^t(\cdot): \mathbb{R}^{|S|} \to \mathbb{R}^{|S|}$.

In some embodiments, the agents utilize a model-free Q-learning algorithm with convergence guarantees. In particular, an optimal action-value function, i.e., Q-value function, of robust Markov games can be written as a function of state, joint action, and reward, which satisfies the following Bellman equation:

$$\overline{Q}_*^i(s, a, \overline{R}^i(s, a)) := R^i(s, a) + \gamma \sum_{s' \in S} P(s'|s, a).$$

$$\sum_{a'} \left( \prod_{j=1}^N \pi_*^j(a'^j|s') \right) \overline{Q}_*^i(s', a', \overline{R}_*^i(s', a')),$$

where $\alpha=(\alpha^1, \ldots, \alpha^N)$ and $\alpha'=(\alpha'^1, \ldots, \alpha'^N)$, $\pi_*^j$ is the equilibrium policy of agent j, and $\overline{R}_*^t(s', \alpha')$ is the $\alpha$'th element of $\overline{R}_{*,s'}^t = \pi_*^{O,i}(s')$, the output of the nature's deterministic policy at the equilibrium.

In some embodiments, a multi-agent policy gradient method with function approximation is used by the agents. The challenges in developing value-based reinforcement algorithms motivates the use of a policy gradient/actor-critic-based approach. In particular, each agent i's policy $\pi^i$ is parameterized as ref for $i \in N$, and the nature's policy is parameterized by a set of policies $\pi_\theta 0:=\{\pi_\theta 0, i\}_{i \in N}$.

The return objective of each agent i under the joint policy $\pi_\theta:=(\pi_{\theta^0}, \pi_{\theta^2}, \ldots, \pi_{\theta^N})$ is defined as $J^1(\theta):=\overline{V}_{\pi_\theta}^i(s_0)$, where se denotes the initial state, $\theta=(\theta^0, \theta^1, \ldots, \theta^N)$ is the concatenation of all policy parameters with $\theta^0=(\theta^{0,1}, \ldots, \theta^{0,N})$, and $\overline{V}_{\pi_\theta}^t$ is the value function under joint policy if $\pi_\theta$ that satisfies
$\overline{V}_{\pi_\theta}^t(s)=\Sigma_{\alpha \in A}\Pi_{j=1}^N \pi_{\theta^j}(\alpha^j|s)(\pi_{\theta^{0,i}}(s)[\alpha]+\gamma\Sigma_{a \in s}$
$P(s'|s,\alpha)\overline{V}_{\pi_\theta}^t(s'))$. $\pi_{\theta^{0,i}}(s)[\alpha]$ is the $\alpha$-th element of the output vector $\pi_{\theta^{0,i}}(s)$.

Figure 2:
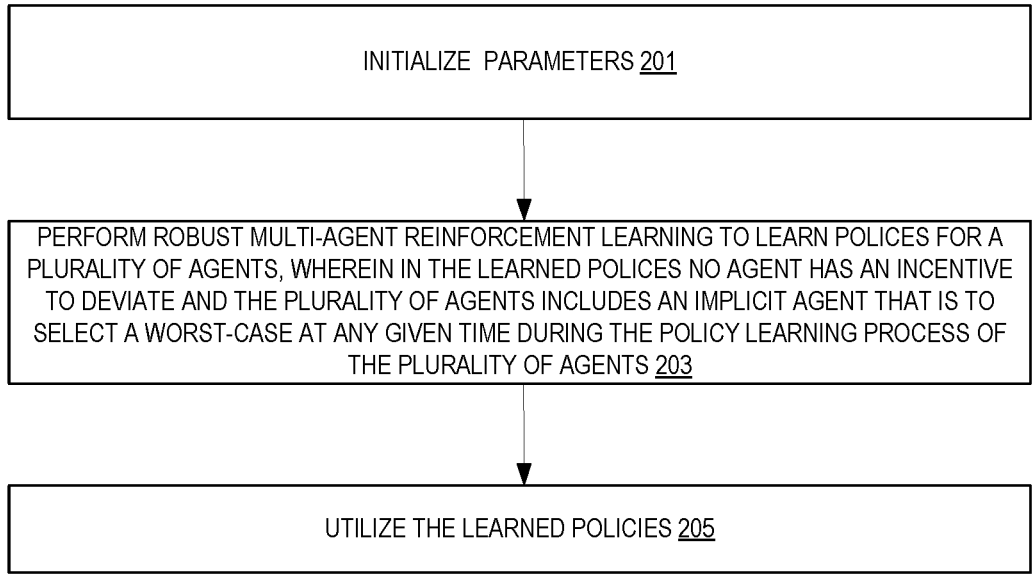
FIG. 2 is a flow diagram illustrating operations of a method for robust MARL according to some embodiments.

FIG. 2 is a flow diagram illustrating operations of a method for robust MARL according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the agents of the other figures.

At 201, parameters for robust MARL are initiated. Examples of parameters that may be initiated include, but are not limited to: action-value (Q) parameters, policy parameters, state parameters, etc.

Performing robust multi-agent reinforcement learning to learn polices for a plurality of agents, wherein in the learned polices no agent has an incentive to deviate and the plurality of agents includes an implicit agent that is to select a worst-case at any given time during the policy learning process of the plurality of agents 203. As noted above, there are several different ways of performing this robust MARL including, but not limited to: a value iteration approach applied by the agents, agents' utilization of a model-free Q-learning algorithm with convergence guarantees, and/or agents' utilization of a multi-agent policy gradient method with function approximation. Further details of the model-free Q-learning and the multi-agent policy gradient are detailed in subsequent figures.

At some point later in time, the learned policies are utilized at 205. For example, one or more of the agents 110 utilize their learned policy to interact with the environment 112.

Figure 3:
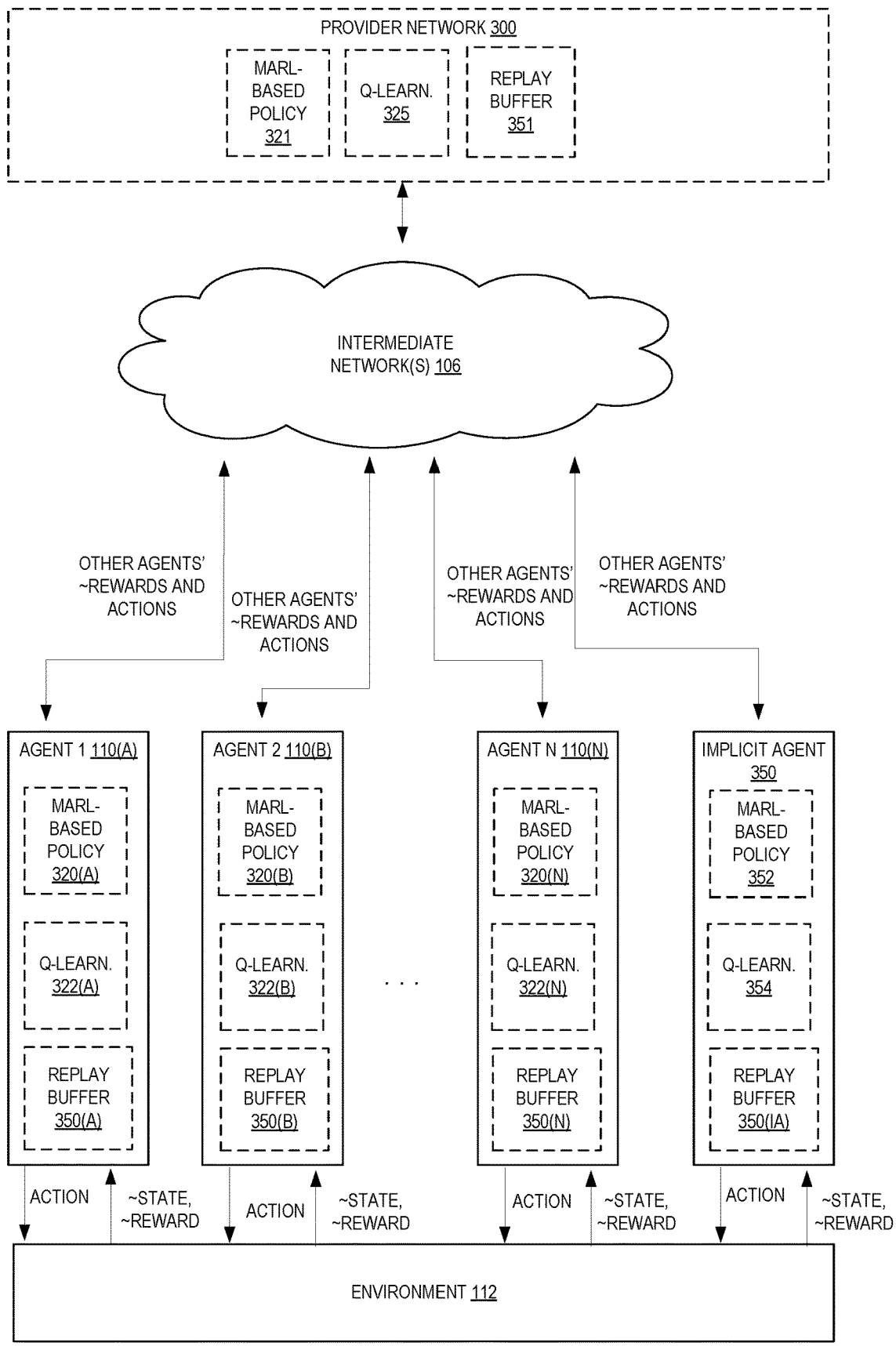
FIG. 3 illustrates embodiments of robust MARL that utilize Q-learning.

FIG. 3 illustrates embodiments of robust MARL that utilize Q-learning. As shown, each agent 110(A)-(N) and the implicit agent 130 interact with the environment 112. In particular, an action is performed by the agents and an uncertain state for the next time stamp and uncertain reward are returned from the environment 112.

Each agent 110(A)-(N) and the implicit agent 130 include a MARL-based policy 320(A)-(N) and 352 (detailed above), and a Q-learning algorithm 322(A)-N and 354. To support robust MARL, the agents 110(A)-(N) and the implicit agent 130 communicate their uncertain rewards and/or actions to each other. The agents 110(A)-(N) and the implicit agent 130 communicate with each other through one or more intermediate networks 106 (e.g., the internet, a local area network, a wireless area network, etc.). Actions taken by the agents, associated states, and rewards, etc. are stored in replay buffers 350(A)-(N) and (IA).

The Q-learning algorithm 322(A)-(N) and 354 utilizes the available state, joint action, and reward information to determine what satisfies the above Bellman equation. In some embodiments, the Q-learning algorithm 322(A)-(N) and 354 utilizes tabular calculations.

Note that while this illustration shows agent individually learning their policy, in some embodiments, one or more of the agents offload this learning to another device such as offloading to compute resources of a provider network 300. In those embodiments, the provider network 300 includes storage for the MARL-based policy(ies) 321 and/or replay buffer(s) 351, and compute resources for Q-learning 325.

Figure 4:
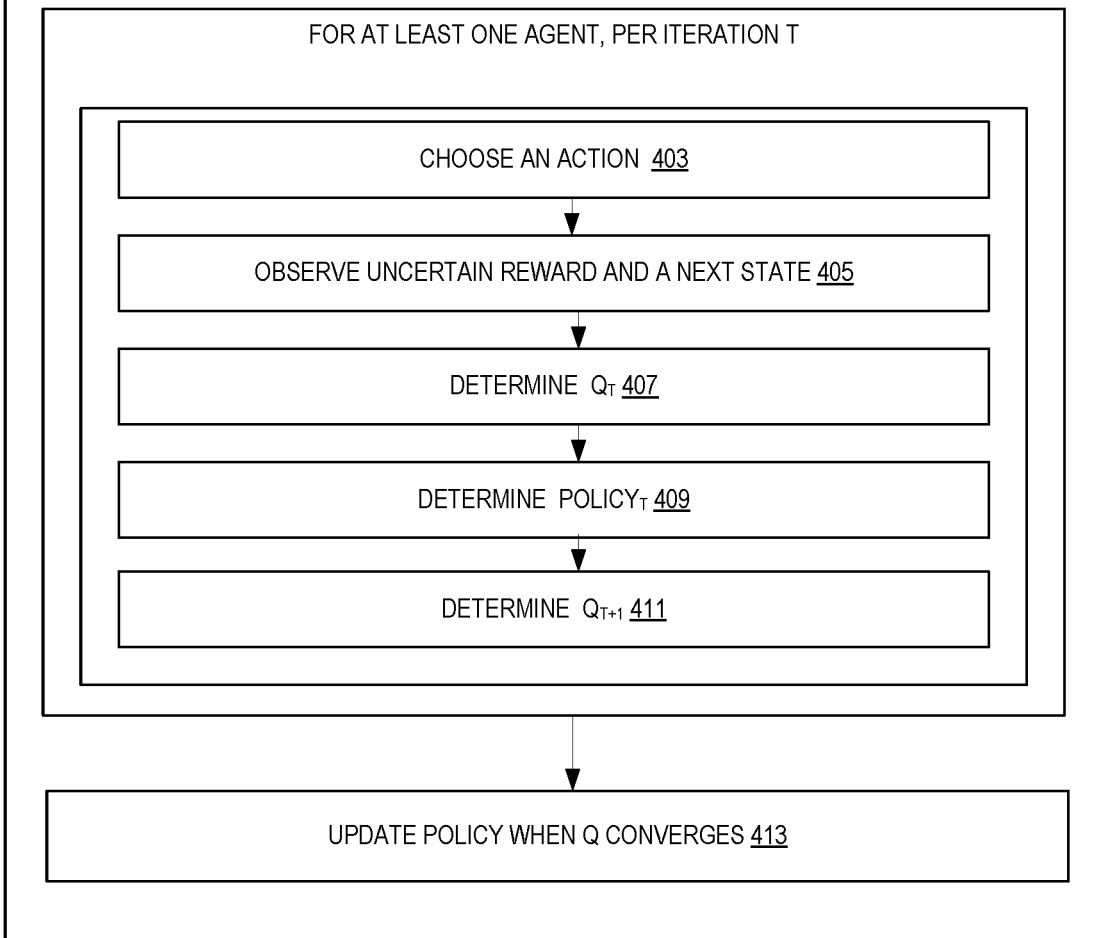
FIG. 4 is a flow diagram illustrating operations of a method for robust MARL using Q-learning according to some embodiments.

FIG. 4 is a flow diagram illustrating operations of a method for robust MARL using Q-learning according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by agents of the other figures.

In particular, this flow shows operations of Q-learning algorithm for a single agent for operation 203. Other agents perform this, or similar flows. For each time unit iteration (e.g., second, minute, etc.) to apply for learning, the agent performs one or more operations.

At 403, an action is chosen. For example, an action is chosen to take based on the state.

The agent observes its own reward, an uncertain next state, receives actions taken by all other agents and other agents uncertain rewards at 405. Note that in some embodiments, actions, state, etc. are stored in a replay buffer associated with the agent.

An action-value (Q) for the tuple of state, uncertain reward, and the actions is determined according to a Bellman equation that accounts for uncertainty at 407. For example, the Q-value that satisfies the following Bellman equation:

$$\overline{Q}^i_*(s, a, \overline{R}^i(s, a)) := R^i(s, a) + \gamma \sum_{s' \in S} P(s'|s, a).$$

$$\sum_{a'} \left( \prod_{j=1}^{N} \pi^j_*(a'^j|s') \right) \overline{Q}^i_*(s', a', \overline{R}^i_*(s', a')),$$

where $\alpha=(\alpha^1, \ldots, \alpha^N)$ and $\alpha'=(\alpha'^1, \ldots, a'^N)$, $\pi^j_*$ is the equilibrium policy of agent j, and $\overline{R}^i_*(s', \alpha')$ is the $\alpha$'th element of $\overline{R}_{*s}^{0,i}(s')$, the output of the nature's deterministic policy at the equilibrium is updated. Note that this Q-value is also uncertain.

The tabular-setting Q-learning update (an iteration of updating the Q-value) can be performed as:

$$\overline{Q}^i_{t+1}(s_t, a_t, \overline{R}^i_t) :=$$

$$(1-\alpha_t) \cdot \overline{Q}^i_t(s_t, a_t, \overline{R}^i_t) + \alpha_t \cdot \left[ \overline{R}^i_t + \gamma \sum_{a_{t+1}} \pi_{*,t}(a_{t+1}|s_{t+1}) \overline{Q}^i_t(s_{t+1}, a_{t+1}, \overline{R}^i_{t+1}) \right],$$

with $\overline{R}^t_r = \pi_{*,s}^{0,1}(s_t)[\alpha_t]$, $\alpha^t_t \sim \pi_{*,t}^t(\cdot|s_t)$, and $\overline{R}_{t\to1}^t = \pi_{*,s}^{0,1}(s_{t+1})[\alpha_{t+1}]$. Here, $\pi_{*,t}^0 = \{\pi_{*,t}^{0,1}\}_{a \in N}$ and $\pi_{*,t} = \prod_{t=1}^{N} \pi_{*,t}^j$ denote the equilibrium policies of the nature and the equilibrium joint policies of all agents, respectively. The term $\pi_{*,t}^{0,t}(s)[\alpha]$ denotes the $\alpha$-th element of the output of the policy $\pi_{*,s}^{0,t}(s)$. This updates the Q-network. Note that for t=, there is a random initialization of $\overline{Q}_t$, etc., but $\pi_{*,t}$ is to be calculated.

At 409, a policy for the iteration t is calculated by solving $$(\pi^i_{*,t}(*|s), \pi_{*,t}^{0,i}(s)) \in$$

$$\underset{\pi^i(*|s), \pi^{0,i}(s)}{\operatorname{argmaxmin}} \sum_{a \in A} \pi^i(a^i|s) \prod_{j \neq i} \pi^j_*(a^j|s) \overline{Q}^i_t(s, a, \pi^{0,i}(s)[a]),$$

where $\pi^{0,t}(s)[\alpha]$ is the $\alpha$-th element of the output vector $\pi^{0,t}(s)[\alpha]$.

With $\overline{Q}_t$ and $\pi_{*,t}$ solved, $\overline{Q}_{t\to1}$ is found at 411. These iterative solving of q is repeated to find the Q-value until it converges. When there is a convergence, then the above policy calculation is applied to get optimized policies at 413.

Figure 5:
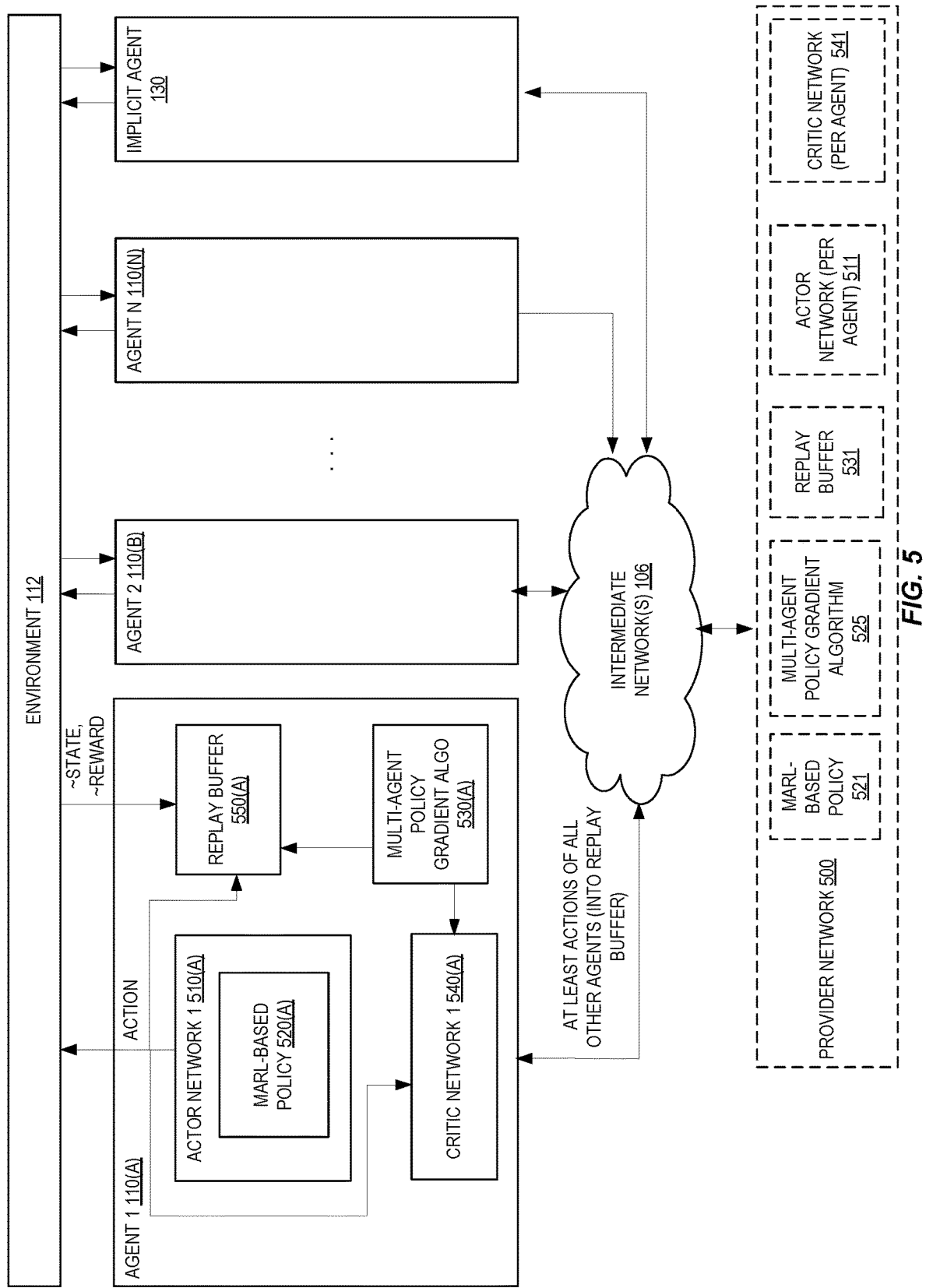
FIG. 5 illustrates embodiments of robust MARL that utilize a multi-agent policy gradient algorithm with function approximation.

FIG. 5 illustrates embodiments of robust MARL that utilize a multi-agent policy gradient algorithm with function approximation. As shown, each agent 110(A)-(N) and the implicit agent 130 interact with the environment 112. In particular, an action is performed by the agents and an uncertain state and uncertain reward are returned.

Each agent 110(A)-(N) and the implicit agent 130 includes a MARL-based policy (e.g., MARL-based policy 520(A)) (detailed above). This policy is used by an actor network (e.g., 510(A)) during inference to make policy-based action decisions. During training, using a multi-agent policy gradient algorithm (e.g., multi-agent policy gradient algorithm 530(A)), both the actor network and a critic network (e.g., critic network 540(A)) are updated. In some embodiments, one or both of the networks are multilayer (e.g., two hidden layer) perceptron based. Note that the implicit agent 130 may include critic and actor networks per other agent.

To support robust MARL using a multi-agent policy gradient algorithm with function approximation, the agents 110(A)-(N) and the implicit agent 130 communicate their uncertain rewards and/or actions to each other. The agents 110(A)-(N) and the implicit agent 130 communicate with each other through one or more intermediate networks 106 (e.g., the internet, a local area network, a wireless area network, etc.). Actions taken by the agents, associated states (original and next), and rewards, etc. are stored in replay buffers (e.g., replay buffer 550(A)) that contain common data in each agent.

The multi-agent policy gradient algorithm utilizes the available state, joint action, and reward information to learn a policy. Exemplary pseudocode of this algorithm is as follows: Initialization of Q-value parameters $\{\omega_0^I\}_{I \in N}$, and policy parameters $\{\theta_0^I\}_{I \in N}$, and $\theta_0^0 := \{_0^{0,I}\}_{I \in N}$.

--- for episode = 1 to M do
   Receive an initial state s
   for t = 1, . . . T do
      For each agent i, sample action $a^i \sim \pi_{\theta_i}^i$ with current policy $\pi_{\theta_i}^i$
      Execute joint a = ($a^1$, . . . , $a^N$), and observe new state s'
      Each agent i also receives a reward with uncertainty $\bar{r}^i$
      Store (s, a, $\bar{r}^i$, s') for each i in replay buffer D, lets s' ← s
      for agent i = 1. to N do
      Sample a random mini-batch of S samples of
      ($s_t$, $a_t$, $\bar{r}_t^i$, $s_{t+1}$) from D
      Set
         $y_t = \pi\theta'0,i(s_t)[a_t] +$
         $\gamma \bar{Q}_{w'} \cdot (s_{t+1}, a_{t+1}^1, \ldots a_{t+1}^N)|a_{t+1}^1 \sim \pi_{\theta'^i}(\cdot|s_{t+1})$ Update critic by minimizing the loss $$\mathcal{L}\omega^i = \frac{1}{S}\sum_{t=1}^S (y_t - \bar{Q}_{\omega^i}(s_t, a_t))^2$$

Update actor using the sampled policy gradient $$\nabla_{\theta^i} J^i(\theta) \approx \frac{1}{S}\sum_{t=1}^S \nabla \pi_{\theta^i}(a_t^i | s_t) \nabla_{a^i} \bar{Q}_{\omega^i}(s_t, a_t^1, \ldots, a^i, \ldots, a_t^N)|_{a^i = \pi_{\theta^i}(\theta_t)}$$

$$\theta'^i = (1 - \tau)\theta^i + \tau \nabla_{\theta^i} J^i(\theta)$$

Update implicit actor using the sampled policy gradient $$\nabla_{\theta^{0,i}} J^i(\theta) \approx \frac{1}{S}\sum_{t=1}^S \nabla \pi_{\theta^{0,i}}(s_t)[a_t] + \eta \sum_{t=1}^S \nabla (\pi_{\theta^{0,i}}(s_t)[a_t] - \bar{r}_t^i)^2,$$

$$\theta'^{0,i} = (1 - \tau)\theta^{0,i} + \tau \nabla_{\theta^{0,i}} J^i(\theta)$$

end for
   end for
end for

---

The critic learns a centralized action-value function and the actors explore and upgrade policy parameters. When the policies are unknown during the critic update, each agent learns and evolve its own approximation of others' policies. Using the approximated policies, the agents can learn efficiently although the inferred policies might not be accurate.

For each agent i=1, . . . ,N, the policy gradient of the objective $J^i(\theta)$ with respect to the parameter $\theta$ has the following form:

$$\nabla_{\theta^i} J^i(\theta) = \mathbb{E}_{s \sim \nu_{\pi\theta}^{s0}, \alpha \sim \pi 0(*|s)}[\nabla \log \pi_{\theta^i}(\alpha^i|s) \cdot Q_{\pi\theta}^i(s, \alpha)] \quad \text{(agent)}$$

$$\nabla_{\theta^{0,i}} J^i(\theta) = \mathbb{E}_{s \sim p_{\pi\theta}^{s\theta}, \alpha \sim \pi\theta(*|s)}[\nabla_{\pi_{\theta^{0,i}}}(s)[\alpha]] \quad \text{(implicit agent)},$$

where $$\pi_\theta(a|s) := \prod_{j=1}^N \pi_\theta^j(a^j|s), \rho_{\pi_\theta}^{s_0}(s) := \sum_{t=0}^\infty \gamma^t \cdot Pr(s \to s', t, \pi_\theta)$$

is the discounted ergodic state distribution under joint policy $\pi_\theta$ with state starting from $s_\theta$, where $Pr(s \to s', t, \pi_\theta)$ denotes the probability of transitioning from s to s' under joint policy $\pi_\theta$ with t-steps, and $\pi_\theta^{0,i}(s)[\alpha]$ is the α-th element of the output of $\pi_\theta^{0,i}(s)$.

Note that while this illustration shows agent individually learning their policy, in some embodiments, one or more of the agents offload this learning to another device such as offloading to compute resources of a provider network 500. In those embodiments, the provider network 500 includes storage for the MARL-based policy(ies) 521, a replay buffer (s) 531, and compute resources for a multi-agent policy gradient algorithm 525, an actor network per agent 511, and/or a critic network per agent 541.

Figure 6:
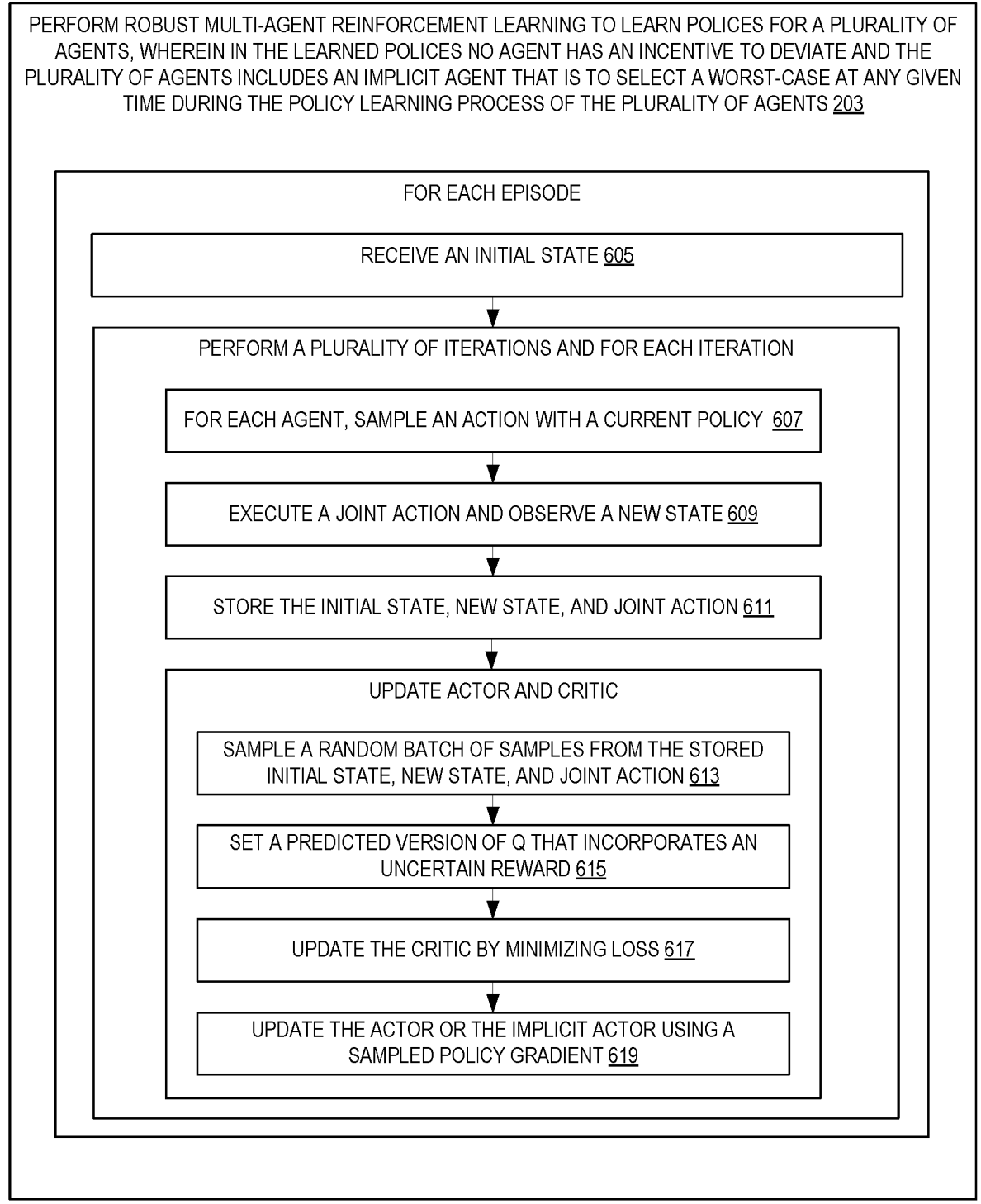
FIG. 6 is a flow diagram illustrating operations of a method for multi-agent policy gradient in robust MARL according to some embodiments.

FIG. 6 is a flow diagram illustrating operations of a method for multi-agent policy gradient in robust MARL according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the agents of the other figures.

For each episode, a plurality of operations are performed after initialization of some parameters such as the initialization of Q-value parameters $\{\omega_0^I\}_{I \in N}$, and policy parameters $\{\theta_0^r\}_{r \in N}$, and $\theta_0^0 := \{\theta_0^{0,r}\}_{r \in N}$. An episode is all states that come between an initial state and a terminal state.

An initial state (s) at is received at 605. From that starting point, a plurality of iterations (t) are performed to update/learn a policy. These iterations comprise a plurality of operations as shown. The initial state applies to all agents.

For each agent, an action with the current policy using the current state is sampled (determined) at 607. In the first (initial) iteration, that is the initial state. The agent and the other agents (including the implicit agent) all perform an action for this iteration.

A joint action α is executed from the sampled actions and a new state is observed at 609. This state applies to all agents. Each agent will also receive a reward with uncertainty based on the executed joint action.

The initial state, new state, and joint action are stored in a replay buffer accessible to, or in, each agent at 611. Additionally, the state is set to the new state (next state).

Each agent then performs a plurality of operations to update its actor and critic. A random batch of samples from the stored initial state, new state, and joint action is sampled at 613.

A version of the Q-value parameters that incorporates a worst-case policy from the implicit actor using an uncertain reward is predicted at 615. This has been detailed above as $$y_t = \pi_{\theta,0,1}(s_t)[\alpha_t] + \gamma \overline{Q}_{*,t}(s_{t \to 1}, \alpha_{t \to 1}^1, \ldots, \alpha_{t \to 1}^N)|_{a_{t+1} \sim \pi \theta^i (\cdot | s_{t \to 1})}$$

Using the predicted version of the Q-value parameters, the critic is updated by minimizing its loss function at 617. An example of this is as follows.

$$\mathcal{L}(\omega^i) = \frac{1}{S} \sum_{t=1}^{S} \left(y_t - \overline{Q}_\omega^i(s_t, a_t)\right)^2$$

The actor or the implicit actor (depending on what agent is being updated) is updated using a sampled policy gradient at 619. Equations for such updating are detailed above.

When each agent updates its actor and critic, then next time iteration (t+1) is evaluated until the terminal state is reached.

Figure 7:
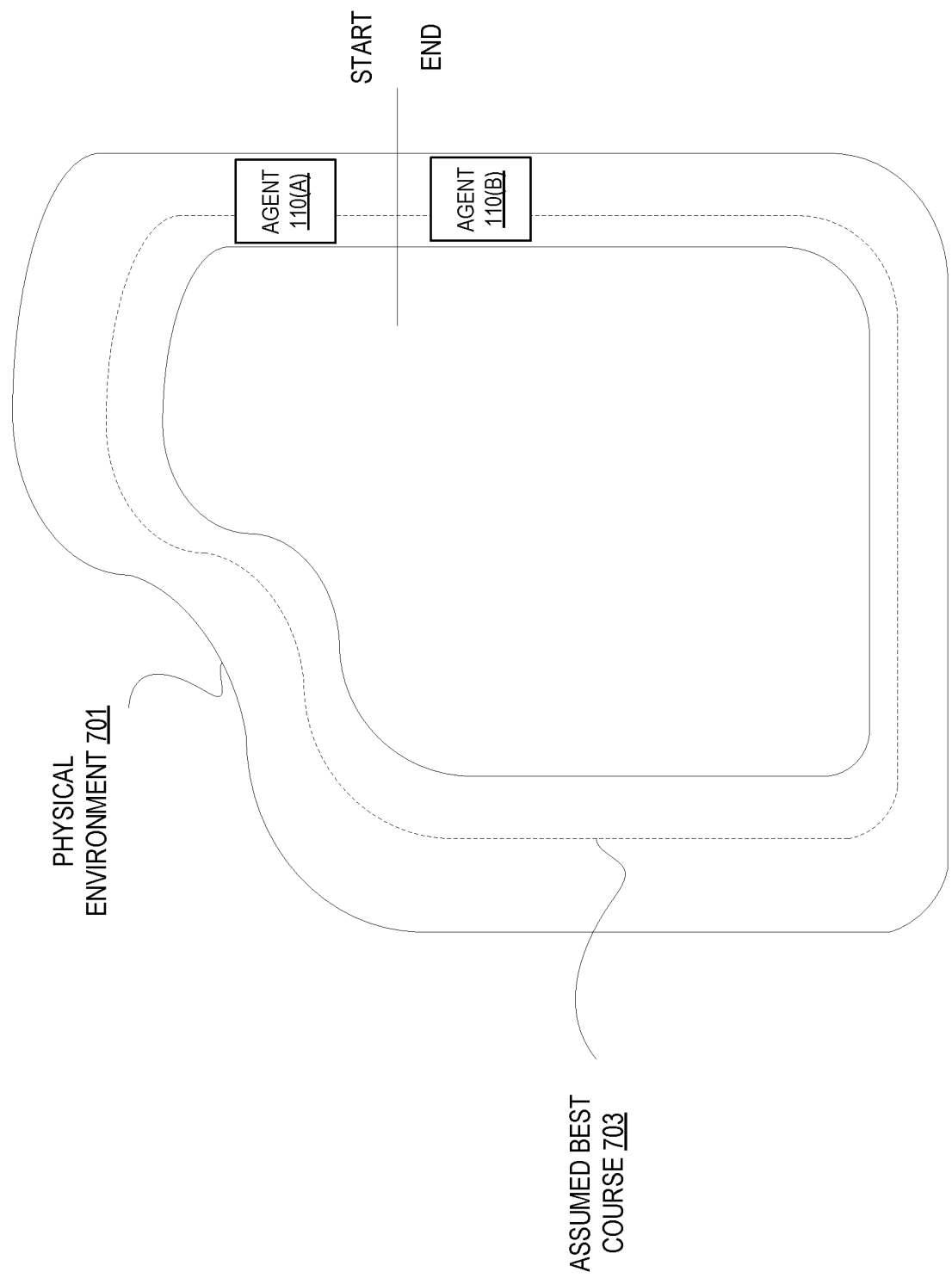

FIG. 7 illustrates an example of physical environment for a plurality of agents to interact with. In this example, a first agent 110(A) is shown leaving a starting point to traverse its way around the physical environment 701 to an end point. A second agent 110(B) trails the first agent 110(A). An assumed best course 703 is shown with dashed lines. Typically, the agents 110(A) and (B) should stay close to that assumed best course 703 and would be rewarded for that behavior. These agents 110(A) and (B) can be trained using robust MARL such that even though each agent has its own reward function and has incomplete information of other agents' rewards and transition dynamics. As such, the desired policy for either agent is one that is not only robust to other agents' policies, but also robust to the possible uncertainty of the MARL model.

Figure 8:
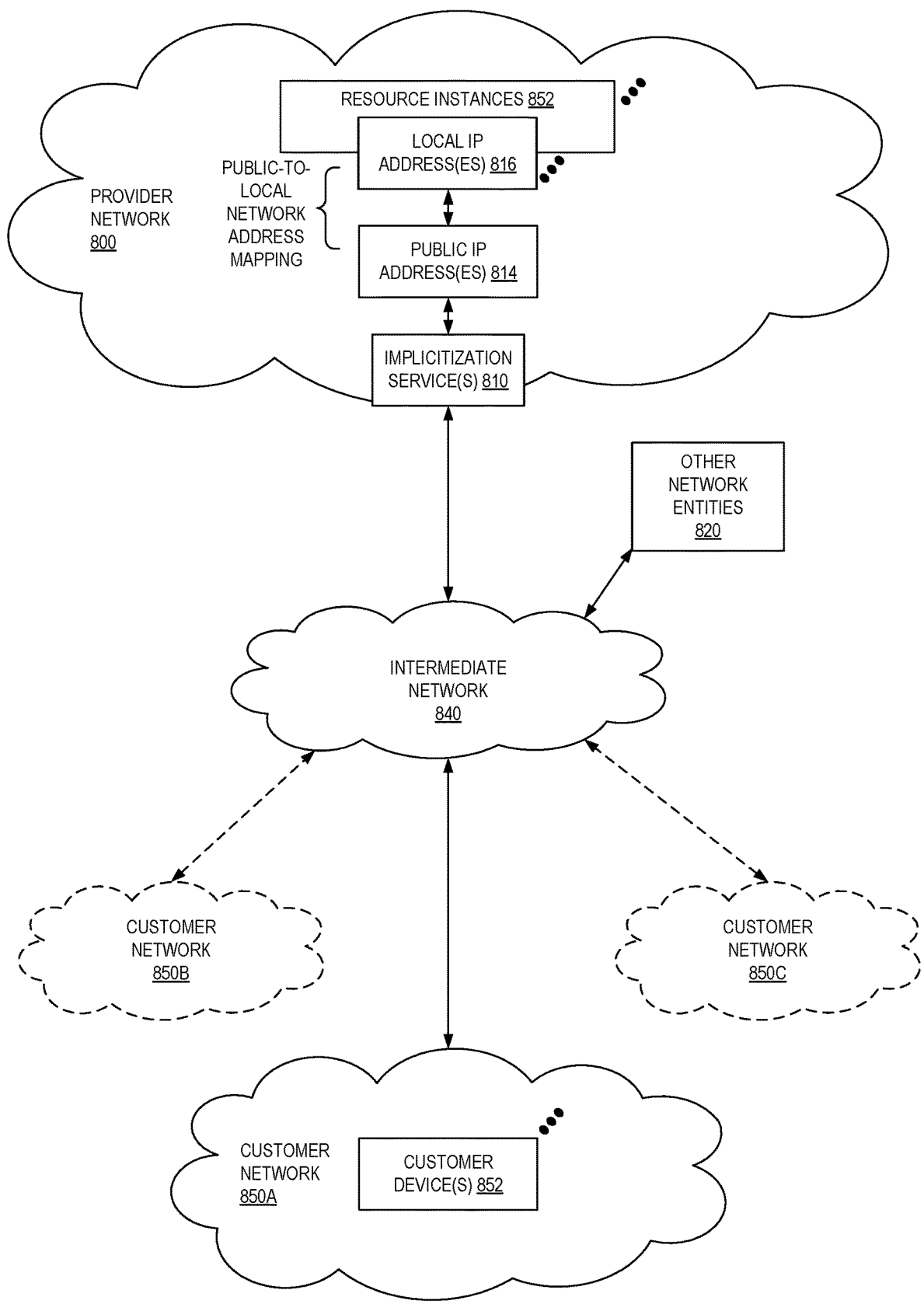
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
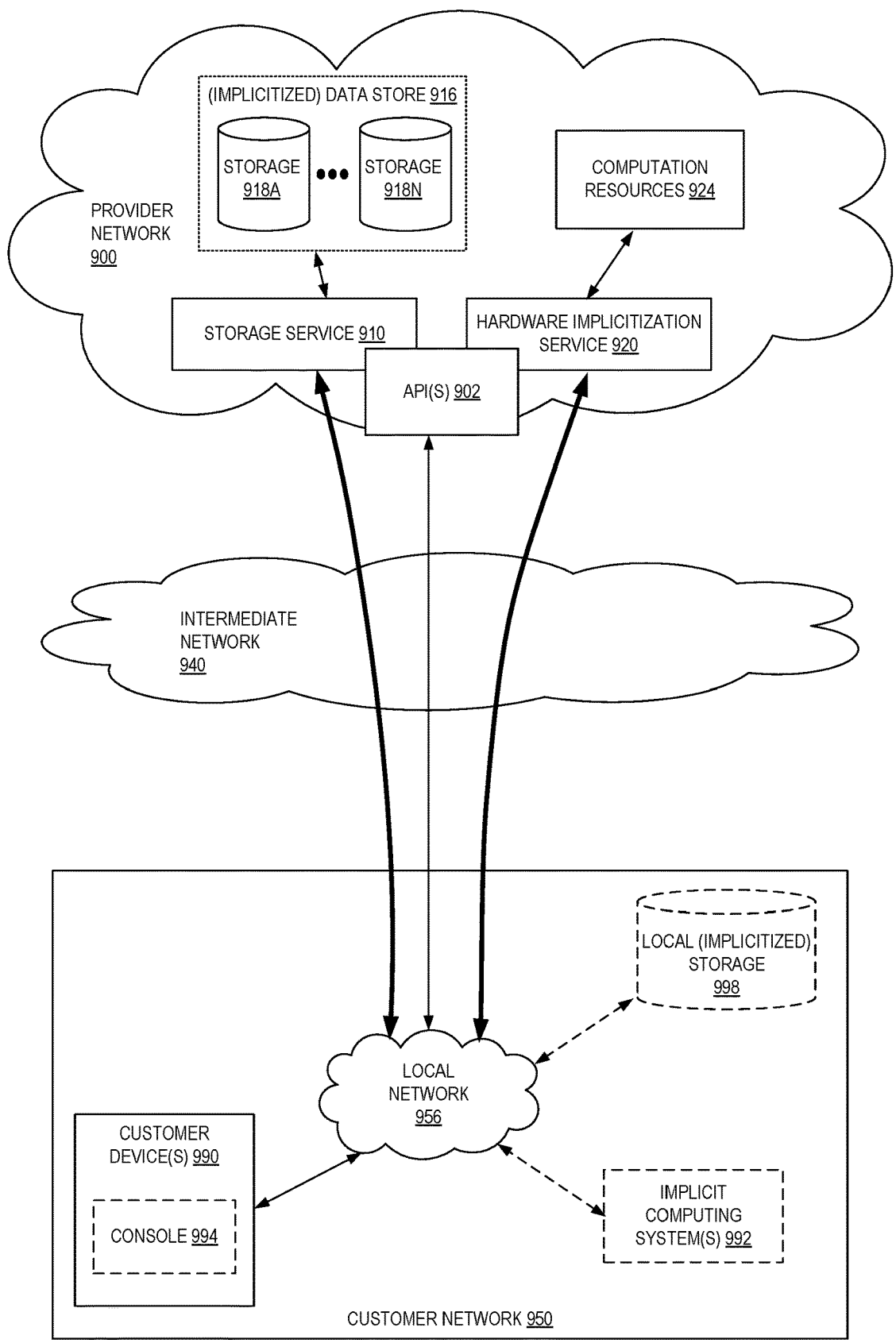
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
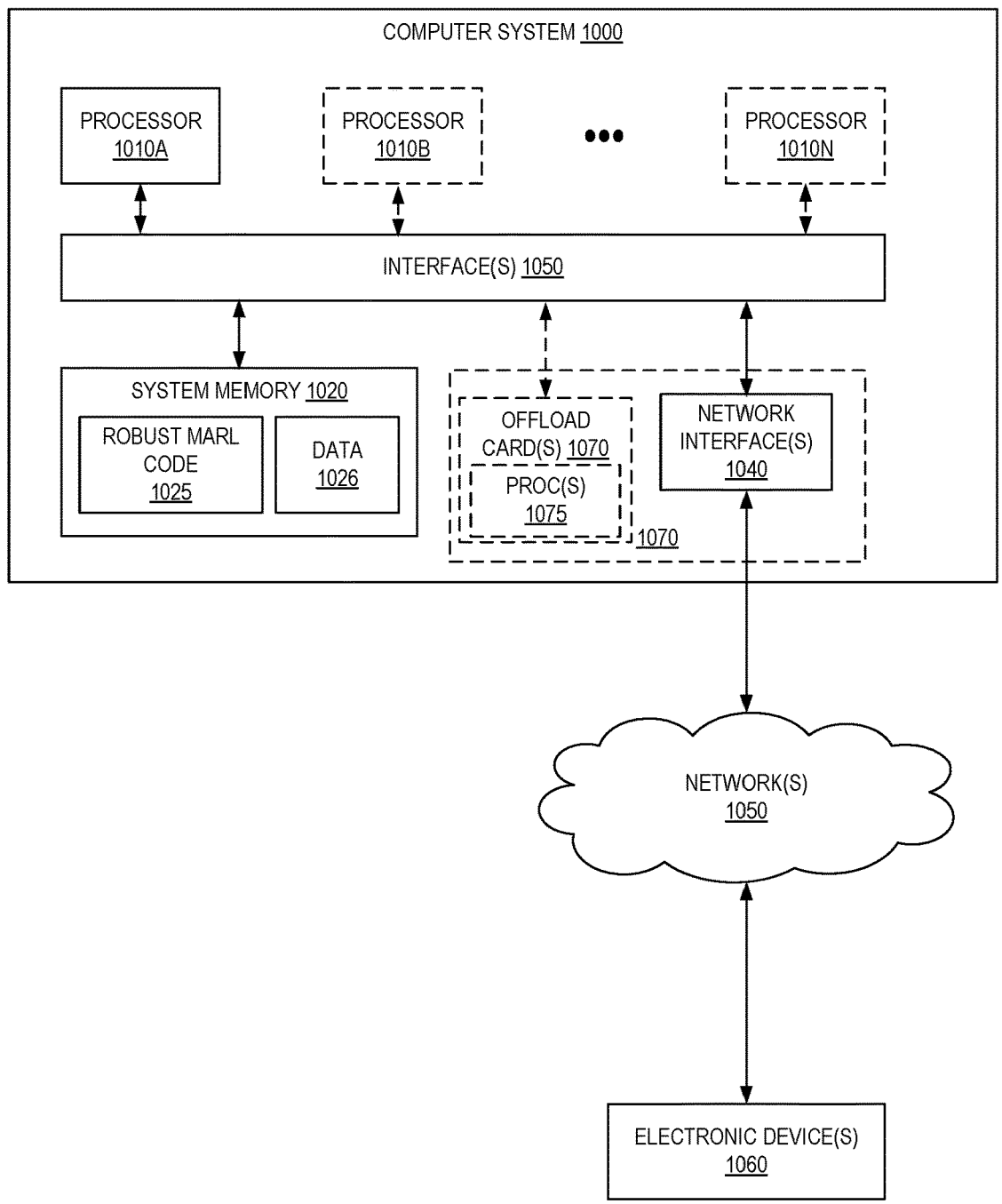
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as code 1025 (e.g., executable to implement, in whole or in part, the robust MARL) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   for each agent of a multi-agent system, sampling an action with a policy of the agent based on a first state, wherein at least one agent of the multi-agent system is an implicit agent that plays against other agents of the multi-agent system by playing to minimize both an expected immediate reward for the implicit agent and an expected future reward for the implicit agent;
   executing a joint action with the agents and observing a second state;
   receiving an uncertain reward at each agent in response to the joint action;
   storing the joint action, uncertain reward, first state, and second state in a replay buffer accessible to each agent;
   for each agent, until a terminal state is reached:

sampling a random batch of samples from the replay buffer,
updating a critic of the agent by minimizing loss between a predicted version of an action-value function and an uncertain version of the action-value function, and
updating an actor of the agent, the updating to factor in the uncertain version of the action-value function.

2. The computer-implemented method of claim 1, wherein the joint action is a set of actions taken by each agent.

3. The computer-implemented method of claim 1, wherein the joint action is taken with respect to an environment common to the agents.

4. A computer-implemented method comprising:
initializing a plurality of parameters for a plurality of agents including at least policy parameters and action-value parameters;
performing robust multi-agent reinforcement learning to learn policies for the agents, wherein in the learned policies no agent has an incentive to deviate, and wherein the agents include an implicit agent that plays against other agents of the plurality of agents by playing to minimize both an expected immediate reward for the implicit agent and an expected future reward for the implicit agent; and
at least one agent of the plurality of agents utilizing its learned policy.

5. The computer-implemented method of claim 4, wherein during the robust multi-agent reinforcement learning each of the agents interacts with a common environment.

6. The computer-implemented method of claim 4, wherein performing robust multi-agent reinforcement learning to learn policies for the agents further comprises:
for each agent, sampling an action with a policy of the agent based on a first state;
executing a joint action with the agents and observing a second state;
receiving an uncertain reward at each agent in response to the joint action;
storing the joint action, uncertain reward, first state, and second state in a replay buffer accessible to each agent;
for each agent, until a terminal state is reached:
sampling a random batch of samples from the replay buffer,
updating a critic of the agent by minimizing loss between a predicted version of an action-value function and an uncertain version of the action-value function, and
updating an actor of the agent, the updating to factor in the uncertain version of the action-value function.

7. The computer-implemented method of claim 6, wherein the joint action is a set of actions taken by each agent and a next state is uncertain.

8. The computer-implemented method of claim 6, wherein the replay buffer is included in each agent.

9. The computer-implemented method of claim 6, wherein the replay buffer is located in a location accessible to each agent.

10. The computer-implemented method of claim 9, wherein the performing robust multi-agent reinforcement learning to learn policies for the agents is performed in a provider network.

11. The computer-implemented method of claim 4, wherein performing robust multi-agent reinforcement learning to learn policies for the agents further comprises performing Q-learning by:
per iteration of an agent,
choosing an action is chosen based on a state,
observing an uncertain reward for the action and a next state,
determining an uncertain Q-value for the iteration,
determining a policy for the iteration using the uncertain Q-value, and
determining an uncertain Q-value for a next iteration using the policy and uncertain Q-value; and
updating the policy when the Q-value converges.

12. The computer-implemented method of claim 11, wherein the Q-learning is tabular.

13. The computer-implemented method of claim 4, wherein performing robust multi-agent reinforcement learning to learn policies for the agents further comprises performing value iteration to learn a value function per agent.

14. A system comprising:
a first one or more agents to implement a policy determined by a multi-agent reinforcement service in a multi-tenant provider network; and
a second one or more electronic devices to implement the multi-agent reinforcement service in the multi-tenant provider network, the multi-agent reinforcement service including instructions that upon execution cause the multi-agent reinforcement service to:
initialize a plurality of parameters for a plurality of agents including at least policy parameters and action-value parameters; and
perform robust multi-agent reinforcement learning to learn policies for the agents, wherein in the policies no agent has an incentive to deviate, and wherein the agents include an implicit agent that plays against other agents of the plurality of agents by playing to minimize both an expected immediate reward for the implicit agent and an expected future reward for the implicit agent.

15. The system of claim 14, wherein the joint action is a set of actions taken by each agent.

16. The system of claim 14, wherein during the robust multi-agent reinforcement learning each of the agents interacts with a common environment.

17. The system of claim 14, wherein to perform robust multi-agent reinforcement learning to learn policies for the agents further comprises:
for each agent, sampling an action with a policy of the agent based on a first state;
executing a joint action with the agents and observing a second state;
receiving an uncertain reward at each agent in response to the joint action;
storing the joint action, uncertain reward, first state, and second state in a replay buffer accessible to each agent;
for each agent, until a terminal state is reached:
sampling a random batch of samples from the replay buffer,
updating a critic of the agent by minimizing loss between a predicted version of an action-value function and an uncertain version of the action-value function, and
updating an actor of the agent, the updating to factor in the uncertain version of the action-value function.

18. The system of claim 17, wherein the joint action is a set of actions taken by each agent and a next state is uncertain.

19. The system of claim 17, wherein the replay buffer is located in a location accessible to each agent.

20. The system of claim 14, wherein to perform robust multi-agent reinforcement learning to learn policies for the agents further comprises performing Q-learning by:
  per iteration of an agent,
    choosing an action is chosen based on a state,
    observing an uncertain reward for the action and a next state,
    determining an uncertain Q-value for the iteration,
    determining a policy for the iteration using the uncertain Q-value, and
    determining an uncertain Q-value for a next iteration using the policy and uncertain Q-value; and
  updating the policy when the Q-value converges.

* * * * *